US011849684B1

(12) United States Patent
Golle et al.

(10) Patent No.: US 11,849,684 B1
(45) Date of Patent: Dec. 26, 2023

(54) LIGHTING FIXTURE AND ASSOCIATED METHOD

(71) Applicant: SunSpectrum Technologies, LLC, Eden Prairie, MN (US)

(72) Inventors: Aaron J. Golle, Lakeville, MN (US); John T. Golle, Eden Prairie, MN (US); David T. Iago, Clifton, TN (US)

(73) Assignee: SunSpectrum Technologies, LLC, Eden Prairie, MN (US)

( * ) Notice: Subject to any disclaimer, the term of this patent is extended or adjusted under 35 U.S.C. 154(b) by 0 days.

(21) Appl. No.: 18/205,950

(22) Filed: Jun. 5, 2023

Related U.S. Application Data

(63) Continuation of application No. 18/095,416, filed on Jan. 10, 2023, now Pat. No. 11,666,007.

(51) Int. Cl.
| | | |
|---|---|---|
| *A01G 7/04* | (2006.01) | |
| *F21V 21/34* | (2006.01) | |
| *F21V 21/15* | (2006.01) | |
| *F21V 21/30* | (2006.01) | |
| *A01G 9/24* | (2006.01) | |
| *F21Y 115/10* | (2016.01) | |

(52) U.S. Cl.
CPC .......... *A01G 7/045* (2013.01); *A01G 9/249* (2019.05); *F21V 21/15* (2013.01); *F21V 21/30* (2013.01); *F21V 21/34* (2013.01); *F21Y 2115/10* (2016.08)

(58) Field of Classification Search
CPC ........ A01G 9/249; A01G 7/045; F21V 21/30; F21V 21/34
See application file for complete search history.

(56) References Cited

U.S. PATENT DOCUMENTS

| | | |
|---|---|---|
| 7,607,815 B2 | 10/2009 | Pang |
| 7,617,857 B2 | 11/2009 | Froese |
| 8,471,274 B2 | 6/2013 | Golle et al. |
| 9,060,468 B2 | 6/2015 | Klase et al. |
| 9,116,276 B2 | 8/2015 | Montfort et al. |
| 9,491,915 B2 | 11/2016 | Storey |
| 9,826,689 B2 | 11/2017 | Shaughnessy et al. |
| 9,901,039 B1 | 2/2018 | Dellerson |
| 9,903,574 B2 | 2/2018 | Golle et al. |
| 10,595,469 B2 | 3/2020 | Golle et al. |
| 10,602,671 B2 | 3/2020 | Limpert et al. |
| 10,842,082 B1 | 11/2020 | Genga et al. |
| 10,941,927 B1 | 3/2021 | Yang et al. |

(Continued)

*Primary Examiner* — William N Harris

(74) *Attorney, Agent, or Firm* — Charles A. Lemaire; Lemaire Patent Law Firm, P.L.L.C.

(57) ABSTRACT

A plant-growing apparatus having a first plurality of lighting panels coupled to a track within an aisle having vertical arrangements of botanical plants along both sides of the aisle. Each lighting panel hangs at fixed location on the track and is rotatable around a vertical axis relative to the track. Some embodiments simultaneously rotate all of the first plurality of lighting panels to alternately face one or the other side of the aisle. Each panel has a front face from which light is emitted. A first plurality of LEDs on the front face of each panel each emits a light spectrum that appears one or more of blue, red, white, infrared, and/or green. Some panels may be unlit at times. Some embodiments provide a continuously variable spacing between the lit face and the plants and variable scheduled lighting periods and changeable spectra for various types and growth stages of plants.

20 Claims, 7 Drawing Sheets

(56) References Cited

U.S. PATENT DOCUMENTS

| | | |
|---|---|---|
| 11,089,736 B2 | 8/2021 | Johnson |
| 2015/0230409 A1* | 8/2015 | Nicole ..................... A01G 9/14 |
| | | 315/153 |
| 2017/0027112 A1 | 2/2017 | Vail et al. |
| 2018/0087755 A1 | 3/2018 | Yorio et al. |
| 2018/0213735 A1 | 8/2018 | Vail et al. |
| 2019/0041048 A1* | 2/2019 | Martin .................... F21S 2/005 |
| 2023/0225263 A1* | 7/2023 | Becker .................... A01G 9/12 |
| | | 47/47 |

\* cited by examiner

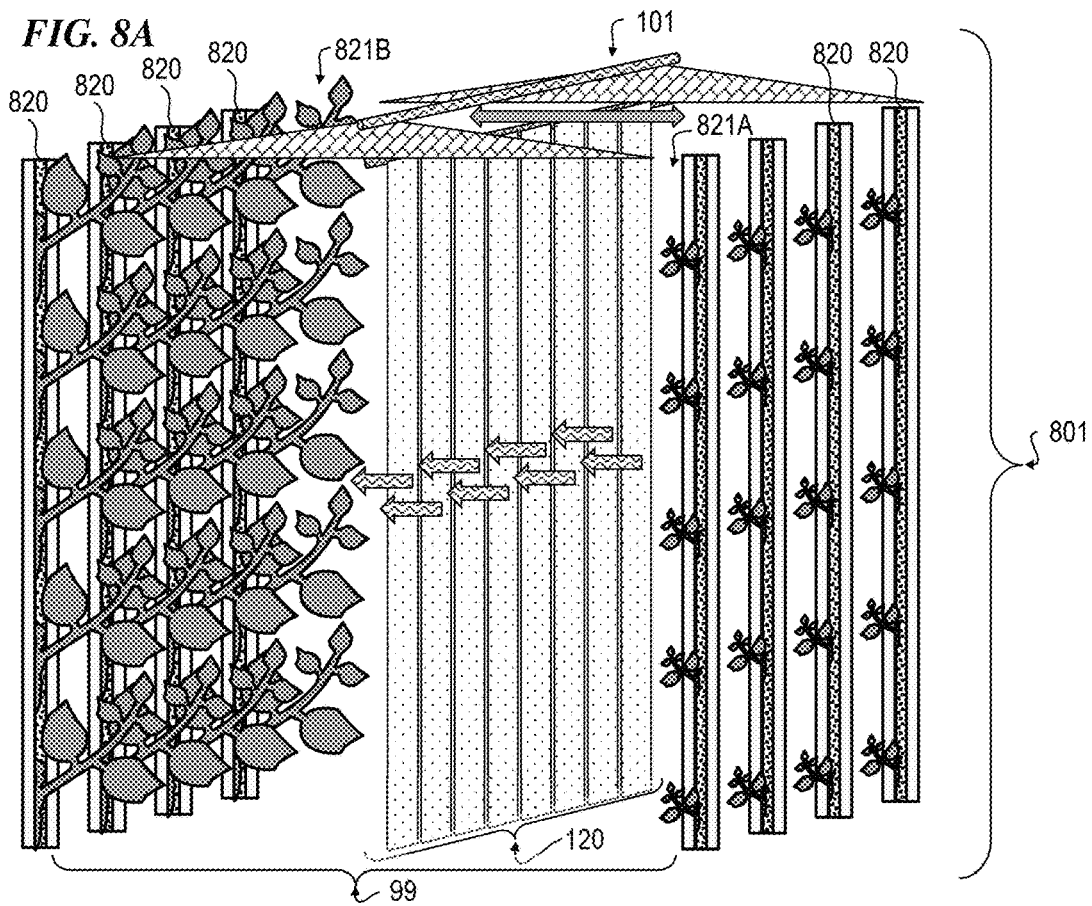
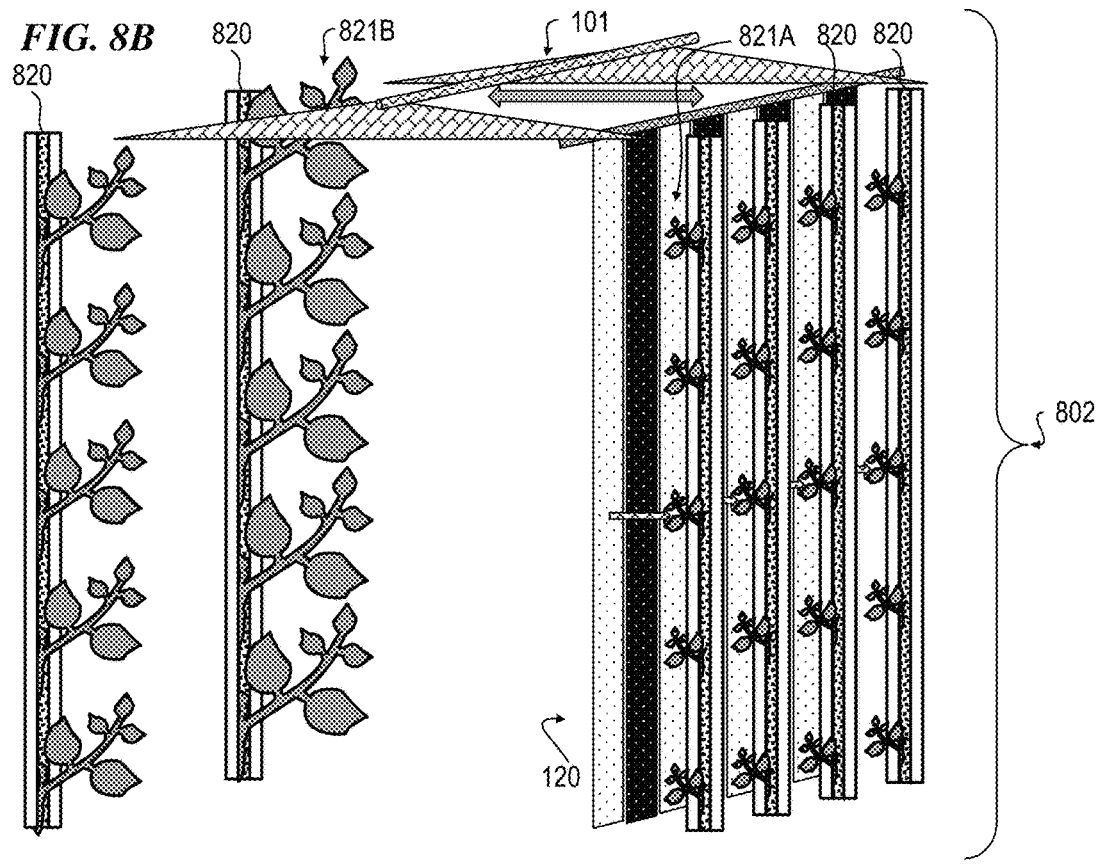

LIGHTING FIXTURE AND ASSOCIATED METHOD

CROSS-REFERENCE TO RELATED APPLICATIONS

This application is a continuation of, and claims priority benefit of, U.S. patent application Ser. No. 18/095,416, filed Jan. 10, 2023 by Aaron J. Golle et al. and titled "Lighting fixture and method" (which issued as U.S. Pat. No. 11,666,007 on Jun. 6, 2023), which is incorporated herein by reference in its entirety.

This application is related to U.S. patent application Ser. No. 17/686,185, filed Mar. 3, 2022 by John T. Golle et al. and titled "Plant-growing apparatus and method" (now abandoned), which claims priority benefit, including under 35 U.S.C. § 119(e), of U.S. Provisional Patent Application No. 63/155,951 filed Mar. 3, 2021 by John T. Golle et al., titled "Plant growing apparatus and method," each of which is incorporated herein by reference in its entirety.

FIELD OF THE INVENTION

The present invention relates to devices and methods for lighting, and in particular to a system and method that includes a plurality of lighting panels hanging from a single overhead track, wherein each of the plurality of lighting panels is simultaneously rotatable to face either of two sides of an aisle along which agricultural plants are growing on both sides, such that light can alternately be delivered to the plants on the two sides. The single overhead track is controllably movable across a substantially continuous range of linear distances from either side of the aisle, in order to be closer to or further from the side being illuminated, for enhanced growth of plants to improve time to harvest, plant size, and plant quality, and to obtain better taste, smell and/or potency of products from the plants.

BACKGROUND OF THE INVENTION

One problem with light-emitting-diode (LED) illumination of crowded plant-growing areas with a large amount of light is the temperature rise associated with locating a large number of LED devices in a small area, which may be damaging to plants. To prevent such damage, it is necessary to manage the heat from the LED devices. In particular, it is desirable to power the LED devices from a low-cost power supply, and to provide a low-cost substrate on which to mount the LED devices.

During certain stages of plant growth, it may be desirable to position lighting panels very close to, but not too close to, the plants to achieve the desired amount of light while preventing overheating the plants from the heat inherently generated by lighting panels. However, because the plants grow (change in size) from fixed locations, it can be difficult to maintain the ideal or desired space between the lighting panels and the plants.

For efficient use of warehouse or greenhouse space, it can be desirable to have plants spaced vertically, in a plurality of columns (plant-growing towers) or in pots or trays placed on shelves one above another, along both sides of an aisle and to have vertical lighting panels that have LEDs mounted to vertical substrates within the aisle, between the plants on each side of the aisle.

Some light-emitting-diode (LED) "grow lights" maximize blue and red light to provide a balance for plants, but high initial purchase cost has prohibited mass adoption for home growers. In addition, even conventional LED grow lights are driven with high current, often consuming 100 to 300 watts of electrical power, which leads to excess heat, forcing growers to keep the LEDs 18 to 30 or more inches away from the plants (which uses up valuable volumetric indoor space) and to use fans and/or air conditioning (involving further cost and volumetric space) in order to remove harmful excess heat.

U.S. Pat. No. 10,602,671 issued to Limpert et al on Mar. 31, 2020 with the title "Gas-delivery light fixture and method for making and using," and is incorporated herein by reference. U.S. Pat. No. 10,602,671 describes a plant-light system that includes a plurality of ducted plant-lighting plenum sheets, wherein each ducted plant-lighting plenum sheet includes a plurality of flexible perforated LED sheets, each LED sheet including a plurality of LEDs arranged on a grid, the plurality of LEDs including LEDs emitting light that appears red, light that appears blue, light that appears white, and light that is at least mostly infrared light, wherein each plant lighting sheet has a length and a width, and wherein the plurality of lighting sheets is arranged along a length of a room; a plurality of plant-holding pockets arranged along the length of the room generally parallel to the plurality of ducted plant-lighting plenum sheets; and a plant-lighting plenum sheets motion and withdrawal system arranged to move the plurality of ducted plant-lighting plenum sheets to a plurality of different locations relative to the plurality of plant-holding pockets for different time periods.

U.S. Pat. No. 9,491,915 issued to Storey on Nov. 15, 2016 with the title "Vertical hydroponic plant production apparatus," and is incorporated herein by reference. U.S. Pat. No. 9,491,915 describes a growing medium for a plant production apparatus utilized in greenhouse crop production is provided. The growing medium comprises a fibrous, nonwoven matrix media material wherein the media material is constructed from a plastic material.

Related prior art includes U.S. Provisional Patent Application No. 61/894,495 filed Oct. 23, 2013 by Aaron J. Golle et al., titled "High powered LED light module with a balanced matrix circuit," P.C.T. Patent Application No. PCT/US2014/061594 filed Oct. 21, 2014 by Aaron J. Golle et al., titled "High powered LED light module with a balanced matrix circuit" (published as WO 2015/061332), U.S. Pat. No. 9,903,574 issued Feb. 27, 2018 to Aaron J. Golle et al., titled "High powered LED light module with a balanced matrix circuit," and U.S. Pat. No. 8,471,274 issued Jun. 25, 2013 to Aaron J. Golle, et al. with the title "LED light disposed on a flexible substrate and connected with a printed 3D conductor," which are all incorporated herein by reference in their entirety.

U.S. Pat. No. 10,595,469 issued to Golle et al. on Mar. 24, 2020, with the title "LIGHTING FIXTURE AND METHOD FOR MAKING AND USING," and is incorporated herein by reference.

U.S. patent application Ser. No. 17/686,185 was filed Mar. 3, 2022 by Golle et al. with the title "PLANT-GROWING APPARATUS AND METHOD," and is incorporated herein by reference.

U.S. Design patent application Ser. No. 29/839,675 was filed May 23, 2022 by Golle et al. with the title "VERTICAL PLANT-GROWING TOWER," and is incorporated herein by reference.

U.S. Pat. No. 8,471,274 to Golle, et al. issued on Jun. 25, 2013 with the title "LED light disposed on a flexible substrate and connected with a printed 3D conductor," and is incorporated herein by reference. U.S. Pat. No. 8,471,274 describes a flexible planar substrate including a first surface that is planar, at least one bare light-emitting-diode ("LED") die coupled to the substrate and conductive ink electrically coupling the at least one bare LED die, wherein the conductive ink is disposed on the substrate and extends onto a surface of the LED that is out-of-plane from the first surface.

U.S. Pat. No. 7,607,815 to Pang issued on Oct. 27, 2009 with the title "Low profile and high efficiency lighting device for backlighting applications" and is incorporated herein by reference. U.S. Pat. No. 7,607,815 describes a light source having a flexible substrate and a plurality of dies having LEDs is disclosed. The light source can be conveniently utilized to provide an extended light source by bonding the light source to a suitable light pipe. The substrate is divided into first and second regions. The dies are bonded to the substrate in a first region. A portion of the surface of the substrate in the second region is reflective. The substrate is bent such that the second region forms a reflector that reflects light that would otherwise be emitted in a non-useful direction to a more useful direction. The substrate can be constructed from a three-layer flexible circuit carrier in which the dies are mounted on a bottom metal layer to provide an improved thermal path for heat generated in the dies.

U.S. Pat. No. 7,617,857 to Froese issued Nov. 17, 2009 with the title "Illuminated window blind assembly" and is incorporated herein by reference. U.S. Pat. No. 7,617,857 describes an illuminated blind assembly having either horizontally oriented slats or vertically oriented slats. The slats have structure that allows them to be illuminated. The slats can be A.C. or D.C. powered. The window blind assembly may have a housing containing rechargeable batteries. These batteries can be charged by photovoltaic solar cells that are positioned on the top surfaces of the slats. The window blind assembly can have a tilt/raise/lower pulley system structure and electrical servos in a housing extending across the top of the window blind assembly. An infrared remote sensor can be located in the front of the housing for controlling the electric servos and the switch for lighting up the slats.

U.S. Pat. No. 9,826,689 to Shaughnessy et al. issued Nov. 28, 2017 with the title "System and method for manufacturing a botanical extract" and is incorporated herein by reference. U.S. Pat. No. 9,826,689 describes a system and method for creating a botanical extract. The system comprising a grow light optimized to stimulate growth of the selected plant and an extractor using supercritical $CO_2$ to obtain the extract.

U.S. Pat. No. 9,116,276 to Montfort et al. issued on Aug. 25, 2015 with the title "Room divider with illuminated light guide blind blade" and is incorporated herein by reference. U.S. Pat. No. 9,116,276 describes an apparatus that includes a first holder configured to hold a light source and having an interface for receiving power to feed to said light source, and a light guide plate configured to be coupled to said first holder and guide light emitted by the light source out from at least one surface of the light guide plate.

What is needed are more efficient and effective lighting solutions that are useful for growing plants, particularly in large mass-production warehouse indoor growing facilities.

SUMMARY OF THE INVENTION

The present invention relates to devices and methods for lighting, and in particular to a lighting system and methods for making and using the lighting system that includes a plurality of lighting panels hanging from a single overhead panel support, wherein each of the plurality of lighting panels is simultaneously rotatable (for example, in some embodiments, rotating about 180 degrees using rack-and-pinion mechanisms that convert linear motion to rotational motion) to face either of two sides of an aisle along which agricultural plants are growing on both sides, such that light can alternately be delivered to the plants on the two sides. The single overhead panel support is controllably movable across a substantially continuous range of linear distances from either side of the aisle, in order to be closer to or further from the side being illuminated. In some embodiments, up to about 12 hours of illumination is provided to each side of the aisle during each 24-hour day (in other embodiments, more than 12 hours of illumination is provided to one side and less than 12 hours is provided to the other side, and still other embodiments the total illumination/dark cycle is longer or shorter than 24 hours) for enhanced growth of plants to improve time to harvest, plant size, and plant quality, and to obtain better taste, smell and/or potency of products from the plants.

In some embodiments, the LED illumination panels and motion system of the present invention are used in controlled-environment agriculture (CEA) applications.

BRIEF DESCRIPTION OF THE FIGURES

FIG. 8A is perspective-view diagram of a portion of an indoor grow-space warehouse 801 that includes one or more systems 101 for laterally moving panel-support-and-rotation system 120 to different locations across the width of an aisle 99, with the light-emitting face of panels 124 facing the left side of aisle 99, according to some embodiments of the present invention.

FIG. 8B is another perspective-view diagram of a portion of indoor grow-space warehouse 802 with the light-emitting face of panels 124 facing the right side of aisle 99 and moved closer to the seedlings on the right side of the aisle, and with some of the lighting panels 124 turned off.

DETAILED DESCRIPTION OF THE INVENTION

Figure 1A:
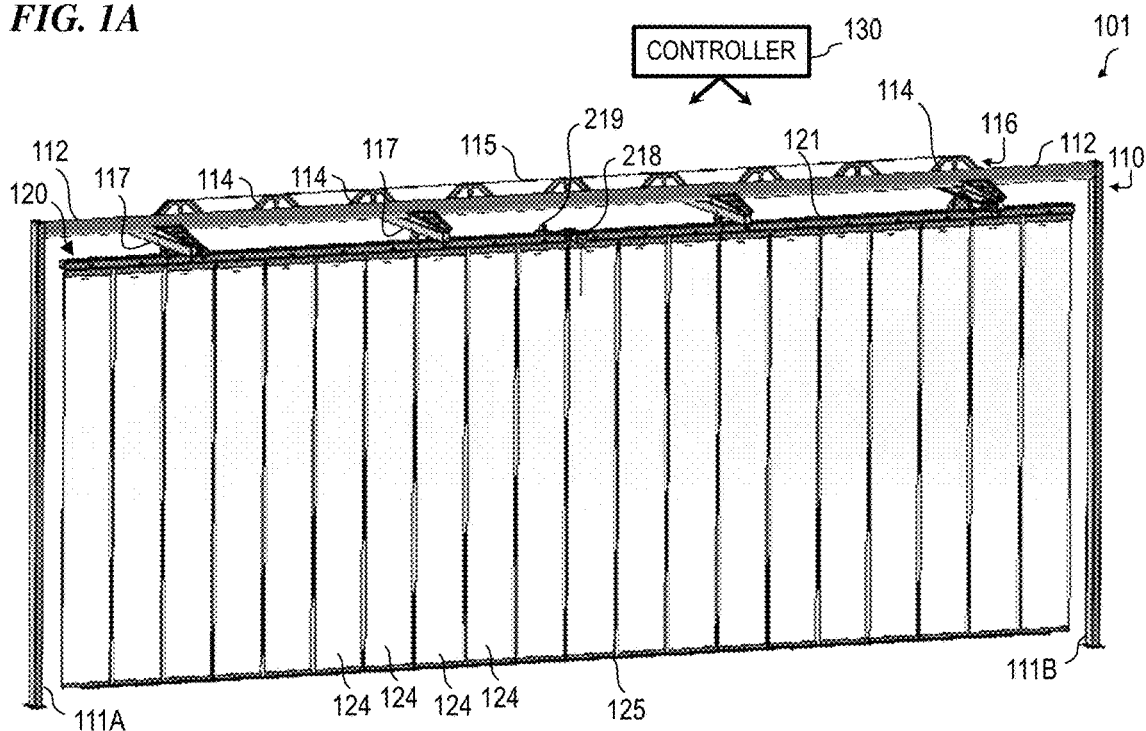
FIG. 1A is perspective view diagram of a plant lighting apparatus 101, according to some embodiments of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, the present invention uses a plurality of 12" by 24" or 6" by 48" (i.e., approximately 30.48 cm by 60.96 cm or 15.24 cm by 121.92 cm) or other suitable-size polyethylene terephthalate (PET, e.g., 2 mil thick)/1-oz. copper-trace-covered flex-circuit substrates with, for example, 288 LEDs spaced uniformly at one-inch pitch in both the X and Y directions and operating at a power density of 48 W/ft², and with on the order of 60% (or more) of the substrate removed, leaving the circuit-containing LEDs intact. Higher power densities can be accommodated by increasing the copper thickness and, if needed, replacing the PET substrate with higher-temperature-capable substrates such as polyethylene naphthalate (PEN) or polyimide. In other embodiments, one or more other sizes of flex circuit substrates is used. In some embodiments, a plurality of flex-circuit substrates is held in a metal (such as aluminum) frame and electrically interconnected to for a lighting panel.

Flexible Plant-Illumination-Sheet Cartridges

In the present invention, power and time are optionally controlled to provide the optimum Daily Light Integral (DLI) and light/dark ratio for the particular plants being grown. In some embodiments, light-panel vertical heights of 8 feet, 10 feet, 12 feet, or other suitable heights allow vertical growth zones. The distance between lighted light panels and plants is changed over time, from an initial position of an inch or two (2.5 cm to 5 cm) from starting seedlings, to accommodate plant growth along vertical wall growth configurations. The present invention may also be advantageously used for stacks of horizontal beds of plants stacked one on top or another. See also the novel movable track system of FIG. 1A described below.

Novel Laterally Movable Track System for Vertical-Grow Lights Accommodates Both Multiple Growth Zones and Adjustable Distance from Plants, to Compensate for Plant Growth and Differing Light Requirements Across the Growth Cycle of the Plants The present invention is unlike prior-art systems that require multiple tracks and switches and slidable chained light assemblies that are moved out of one track and into other parallel tracks to one of two or more discrete spaced-apart zones to attempt to provide optimal DLI (Daily Light Integral) and light/dark ratios. The present invention provides fewer and simpler light assemblies than would be needed in other systems that provide total coverage and need to turn lighting zones on and off.

Surround Light (Volumetric Light Flux)

In some embodiments, the present invention provides a nutritionally balanced light flux distributed to the canopy, lateral, and bottom surfaces of a plant that triggers all of the plant's receptors. Accordingly, nutrients (deriving from soil, fertilizer, and other chemical and organic supplements) are more efficiently utilized by the plant, reducing cost and increasing yield. In addition, this reduces water and electrical energy usage due to a shortened growth cycle.

FIG. 1A is perspective-view diagram of a plant-lighting apparatus 101, according to some embodiments of the present invention. In some embodiments, plant-lighting apparatus 101 is located in an aisle of an indoor growing facility located in a warehouse that is arranged as a plurality of aisles each having an apparatus 101 between two facing rows of vertical plant-growing towers (see, e.g., FIG. 8A) that are supplied water that drips through fibrous hydroponic root-holding medium in each tower and one or more plants growing outward and/or upward from vertically spaced locations in the towers, or of horizontal shelves holding pots each containing root-holding media and one or more plants, or of walls of pockets each pocket including a root-holding medium and one or more plants. In some embodiments, plant-lighting apparatus 101 includes an elongated support structure 110 and a lighting-panel structure 120. In some embodiments, elongated support structure 110 includes a plurality of sideways-motion hanger tracks 117 (which include one or more motorized sideways-motion hanger tracks 117M and zero or more un-motorized sideways-motion hanger tracks 117U, wherein the M and U designations are not used in some figures) that are affixed to an elongated top support 112 such as a horizontal circular tube (also called, e.g., overhead pipe) 112. In some embodiments, tube 112 is supported at its ends by vertical legs 111A and 111B, and is stiffened by a top rod 115 that is welded to each of a plurality of spaced-apart top supports 114, wherein each of the plurality of spaced-apart top supports 114 is in turn welded to top tube 112. In some embodiments, lighting-panel structure 120 includes a top rail structure 121, a bottom rail structure 125 and a plurality of spaced-apart rotatable lighting panels 124, each suspended and rotatable at its upper end from top rail structure 121, and each held at its respective spaced-apart distance by bottom rail structure 125. In some embodiments, the hanger tracks 117 of the plurality of sideways-motion hanger tracks 117 are relatively evenly spaced apart and include two motorized sideways-motion hanger tracks 117M, one near each end of top rail structure 121, and one or more (e.g., in this embodiment, two) un-motorized sideways-motion hanger tracks 117U towards the middle of top rail structure 121, and top rail structure 121 is maintained at substantially the same lateral positions on all of the sideways-motion hanger tracks 117; thus lighting panels 124 are all positioned at the same distance from the wall of plants that they are illuminating at any given time, but that distance is variable and controlled by a power supply and controller 130 that drives the motorized sideways-motion hanger tracks 117M, and controls the timing, brightness level, spectra and/or other characteristics of the plant-lighting apparatus 101, as well as other aspects of the indoor growing facility such as temperature, humidity, nutrient content, water flow, air flow, and the like.

Figure 1B:
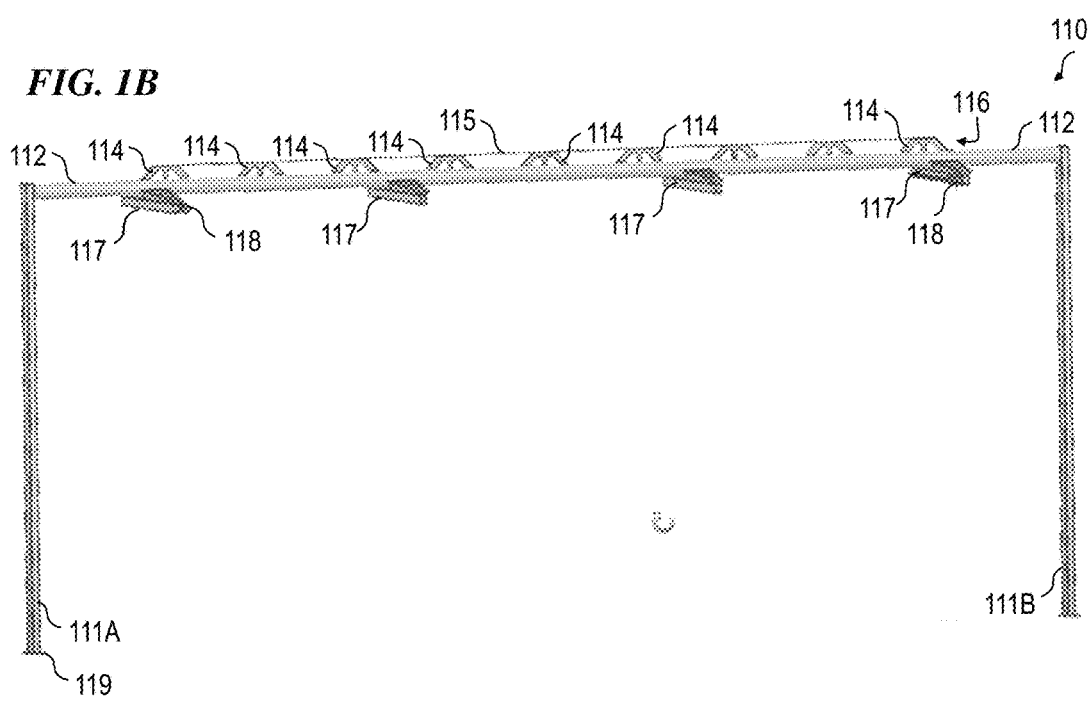
FIG. 1B is perspective view diagram of a plant lighting support structure 110, according to some embodiments of the present invention.

FIG. 1B is perspective-view diagram of plant-lighting support structure 110, according to some embodiments of the present invention. In the embodiment shown, legs 111A and 111B if support structure 110 each include a foot plate 119 that is configured to be bolted to the floor of the indoor growing facility (an example of foot plate 119 is shown in detail in FIG. 1C). In the embodiment shown, the plurality of sideways-motion hanger tracks 117 are relatively evenly spaced and include two motorized sideways-motion hanger tracks 117M, one near each end of top rail structure 121, and two un-motorized sideways-motion hanger tracks 117U towards the middle. In some embodiments, each motorized sideways-motion hanger track 117M includes a rotary motor 118 that drives a screw that drives a threaded bracket relative to its hanger track 117, and the rotary motors 118 that drive the two motorized sideways-motion hanger tracks 117M are synchronously driven to keep the lighting-panel structure 120 parallel to the two sides of its aisle.

Figure 1C:
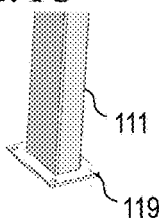
FIG. 1C is close-up perspective view diagram of a leg 111 and foot 119 of support structure 110, according to some embodiments of the present invention.

FIG. 1C is close-up perspective-view diagram of a leg 111 and foot 119 of support structure 110, according to some embodiments of the present invention. In some embodiments, foot plate 119 is welded to the bottom of rectangular steel (or other metal) post 111 and includes a plurality of holes through which bolts may be placed to hold apparatus 101 to the floor in an upright orientation.

Figure 1D:
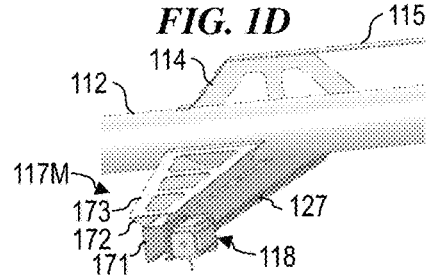
FIG. 1D is close-up perspective view diagram of a motorized hanger track 117 and track-moving motor 118 that attach to, and form parts of, support structure 110, according to some embodiments of the present invention.

FIG. 1D is close-up perspective-view diagram of a motorized track hanger 117M and track-moving motor 118 that attach to, and form parts of, support structure 110, according to some embodiments of the present invention. In some embodiments, structure 117M includes a strut-channel portion 171 (such as a length of metal having a pi-shaped (Π-shaped) cross section conforming to the Metal Framing Manufacturers Association (MFMA)-defined standard for strut channel construction that allows multiple manufacturers' channels to be compatible; the current version of the standard, as of 2020, is MFMA-4, and well-known manufacturers of strut channel, including Unistrut U.S., Cooper Industries/Eaton Corporation, and Thomas & Betts Corp./ABB Group, are members of the MFMA and defined the standard), slanted triangular side walls 172, and perforated top plate 173, wherein portions 171, 172 and 173 are welded together and welded to top tube 112. Motor 118 is mounted to a side of motorized hanger track 117M.

Figure 1E:
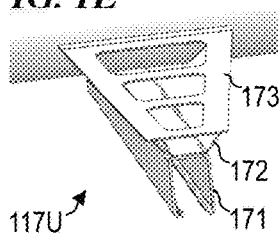
FIG. 1E is close-up perspective view diagram of an unmotorized hanger track 117 that attaches to and forms part of support structure 110, according to some embodiments of the present invention.

FIG. 1E is close-up perspective-view diagram of an unmotorized hanger track 117U attaches to and forms part of support structure 110, according to some embodiments of the present invention. Like-numbered parts are as described for FIG. 1D.

Figure 2A:
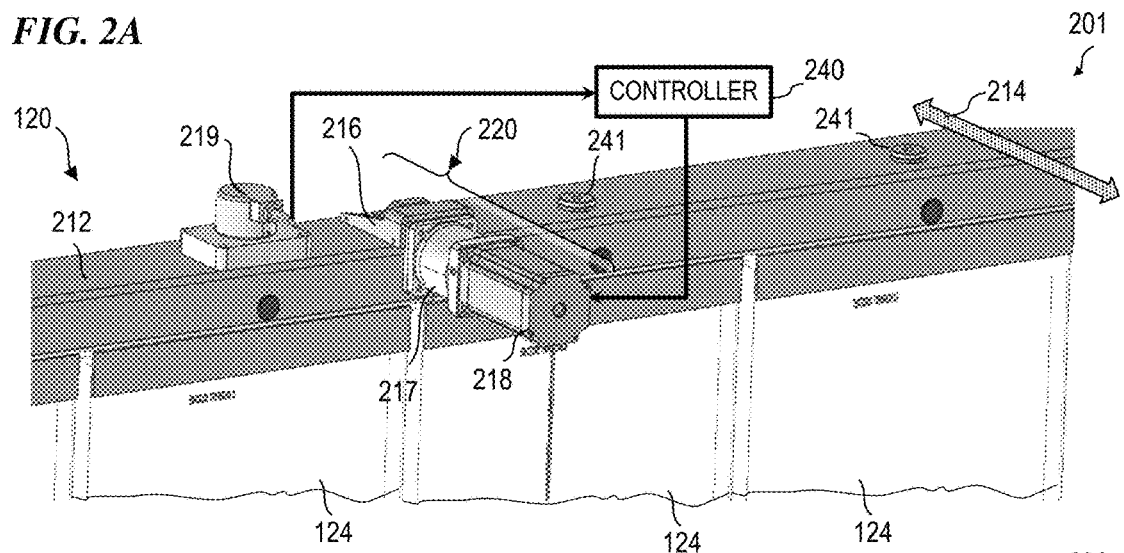
FIG. 2A is close-up perspective-view diagram of a portion 201 of panel-support-and-rotation system 120, according to some embodiments of the present invention.

FIG. 2A is close-up perspective-view diagram of a portion 201 of panel-support-and-rotation system 120, according to some embodiments of the present invention. In some embodiments, panel-support-and-rotation system 120 includes a linear-motion actuator 220 (e.g., in some embodiments, a rotary-motion-to-linear-motion assembly such as a motor-gear-reduction-pinion-gear-and-rack-gear assembly that includes motor 218, gear-reduction box 217 and pinion-gear-and-bracket assembly 216) attached to rectangular metal tube 212. Each of the plurality of lighting panels 124 is attached to the bottom of a corresponding one of a plurality of panel pinion-gear assemblies 241. In some embodiments, one or more assembly of the plurality of panel pinion-gear assemblies 241 further includes a rotary encoder 219 that communicates angular-position data that indicates the angular position of the lighting panels 124 to power supply and controller 240, which in turn controls motor 218. The lateral movement 214 of rectangular metal tube 212 and lighting sheets 124 is controlled by linear actuators (hanger tracks) 117M as shown in, e.g., FIG. 6A.

Figure 2B:
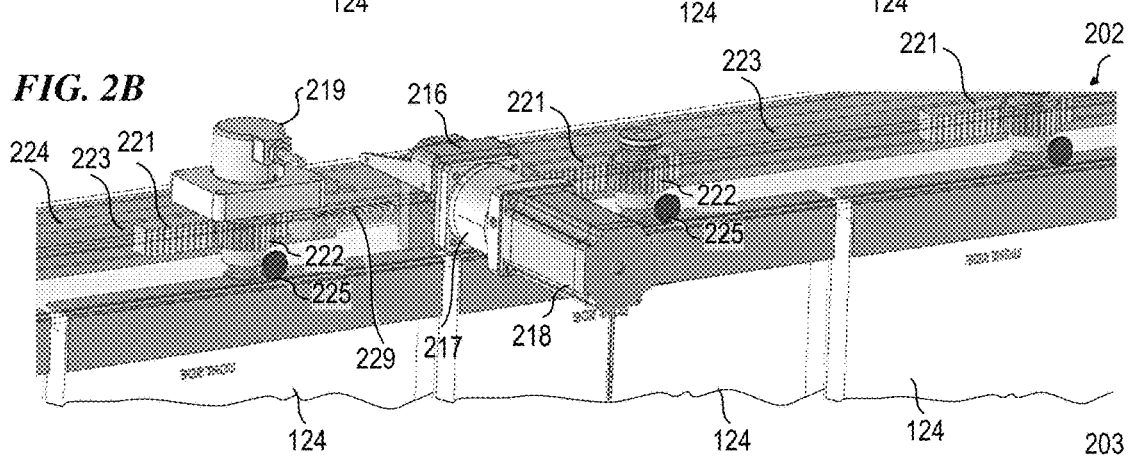
FIG. 2B is close-up perspective-view diagram, partially transparent, of a portion 202 of panel-support-and-rotation system 120 with the light-emitting face of lighting panels 124 facing away from the viewer, according to some embodiments of the present invention.

FIG. 2B is close-up perspective-view diagram, partially transparent, of a portion 202 of panel-support-and-rotation system 120 with the light-emitting face of lighting panels 124 facing away from the viewer, according to some embodiments of the present invention. In some embodiments, linear-motion actuator 220 drives a lubricated bar 223 that extends much of the length of rectangular metal tube 212, and a plurality of linear rack gears 221, one per rotating lighting panel 124, are affixed (e.g., welded) to bar 223 such that when bar 223 is moved longitudinally within tube 212, every one of the plurality of linear rack gears 221 is moved the same corresponding linear amount and drive the plurality of respective pinion gears 222 of the plurality of panel pinion-gear assemblies 241 to rotate the same angular amount, thus simultaneously rotating all of the plurality of lighting panels 124 the same angular amount. In some embodiments, linear-motion actuator 220 includes motor 218, gear-reduction box 217 and pinion-gear-and-bracket assembly 216 that has a pinion gear that drives a linear rack gear 229 affixed to bar 223. In some embodiments, a plurality of access holes 225 through rectangular metal tube 212 allow access to screw 347 (see FIG. 3A) to be loosened and tightened to adjustably affix and hold each pinion gear 222 to a keyed feature 346 (see FIGS. 3A and 3B) between the pinion gear and the correspondingly keyed bracket 410 (see FIG. 4) holding the lighting panel 124. Thus, the relative rotational angle around a vertical axis of each lighting panel 124 is individually adjustable so that the relative angular relationship is controllable. FIG. 2B illustrates a positional configuration wherein all of the lighting panels 124 are facing away from the viewer.

Figure 2C:
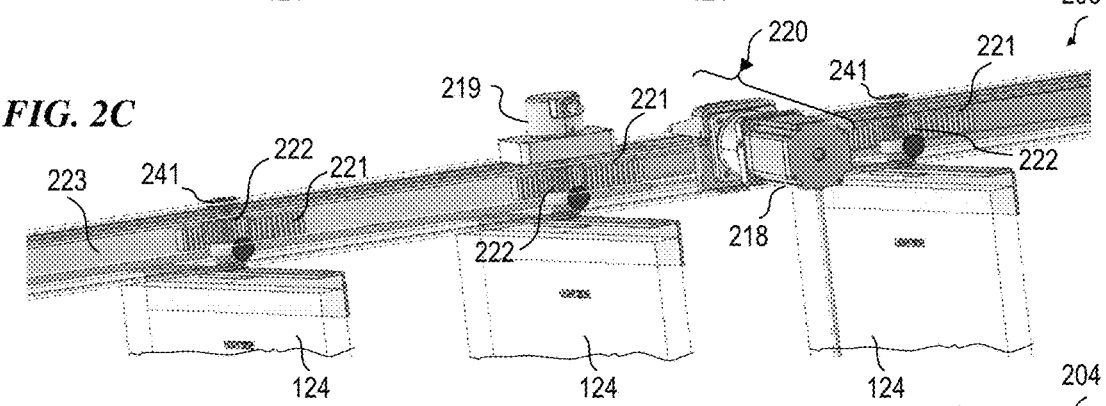
FIG. 2C is close-up perspective-view diagram, partially transparent, of a portion 203 of panel-support-and-rotation system 120 with the lighting panels 124 partially rotated from facing away to facing towards the viewer, according to some embodiments of the present invention.

FIG. 2C is close-up perspective-view diagram, partially transparent, of a portion 203 of panel-support-and-rotation system 120 with the lighting panels 124 partially rotated from facing away to facing partially towards the viewer, according to some embodiments of the present invention. In this transitory position, linear actuator 220 has moved bar 223 somewhat to the right relative to its position in FIG. 2B, thus moving each of the plurality of rack gears 221 by that same amount, and rotating each of the corresponding pinion gears 222 and their respective light panel 124 by a corresponding angular amount.

Figure 2D:
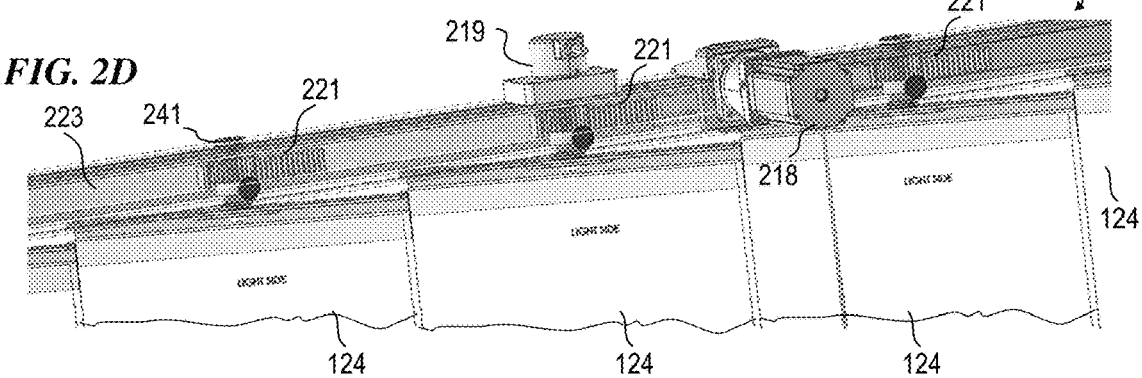
FIG. 2D is close-up perspective-view diagram, partially transparent, of a portion 204 of panel-support-and-rotation system 120 with the light-emitting face of lighting panels 124 further rotated to nearly facing towards from the viewer, according to some embodiments of the present invention.

FIG. 2D is close-up perspective-view diagram, partially transparent, of a portion 204 of panel-support-and-rotation system 120 with the light-emitting face of lighting panels 124 further rotated to nearly facing towards the viewer, according to some embodiments of the present invention. In this position, linear actuator 220 has moved bar 223 somewhat further to the right relative to its position in FIG. 2C, thus moving each of the plurality of rack gears 221 by that same amount, and rotating each of the corresponding pinion gears 222 and their respective light panel 124 by a corresponding angular amount such that all of the plurality of lighting panels 124 are substantially facing the viewer.

Figure 2E:
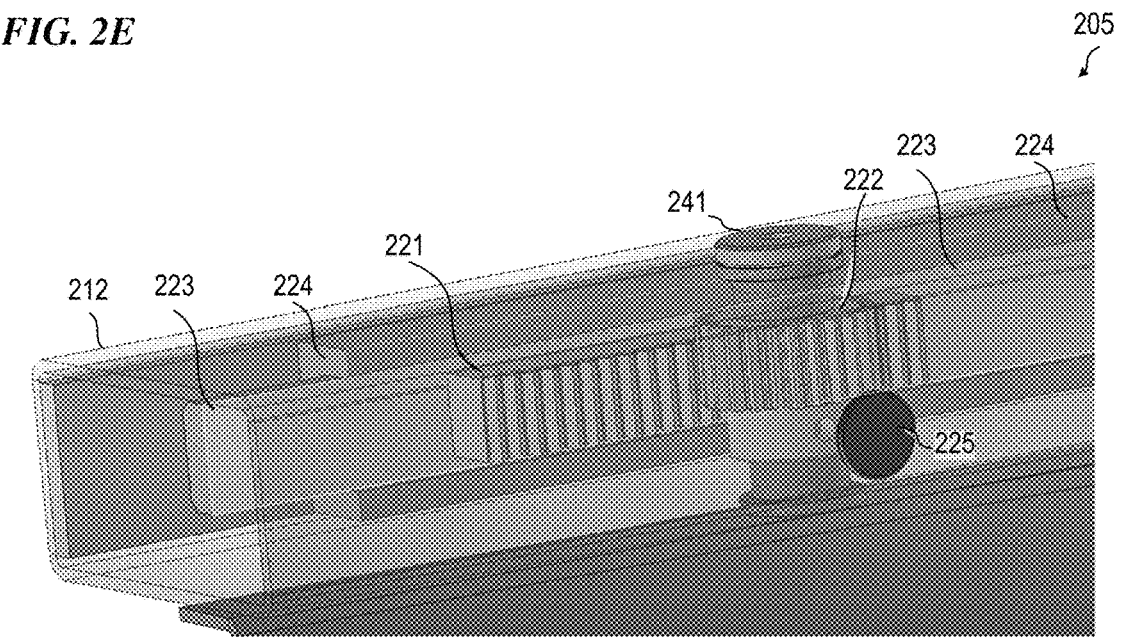
FIG. 2E is close-up perspective-view diagram, partially transparent, of a portion 205 of panel-support-and-rotation system 120 showing the linear-motion-to-rotary-motion rack-and-pinion mechanism that rotates lighting panels 124, according to some embodiments of the present invention.

FIG. 2E is close-up perspective-view diagram, partially transparent, of a portion 205 of panel-support-and-rotation system 120 showing the linear-motion-to-rotary-motion rack-and-pinion mechanism that rotates lighting panels 124, according to some embodiments of the present invention.

Figure 3A:
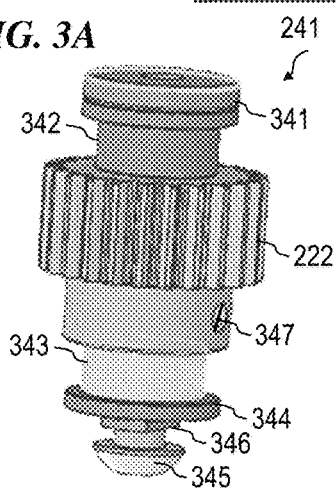
FIG. 3A is close-up perspective-view diagram of a panel pinion gear 241 for one lighting panel 124 of panel-support-and-rotation system 120, according to some embodiments of the present invention.

FIG. 3A is close-up perspective-view diagram of a panel pinion gear assembly 241 for one lighting panel 124 of panel-support-and-rotation system 120, according to some embodiments of the present invention. In some embodiments, panel pinion gear assembly 241 includes a top support 341, a top bearing 342 (e.g., in some embodiments, made of high-density polyethylene (HDPE), Teflon, or other low-friction polymer), pinion gear 222, clamping screw 347, bottom bearing cylinder 343 and cap 344 (e.g., in some embodiments, made of high-density polyethylene (HDPE), Teflon, or other low-friction polymer), keyed feature 346, and bottom cap screw 345. In some embodiments, a cylindrical top extension of keyed feature 346 extends into a cylindrical hole in pinion gear 222 and is clamped thereto by screw 347.

Figure 3B:
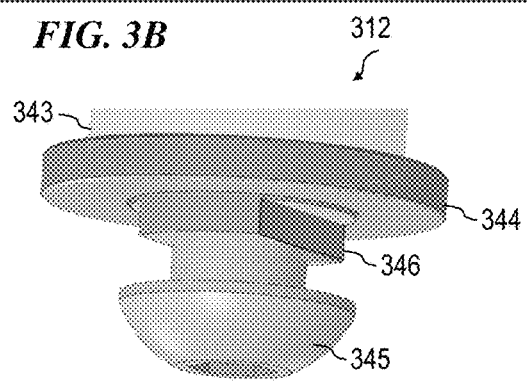
FIG. 3B is close-up perspective-view diagram of a panel pinion-gear key structure 312 of a panel pinion gear assembly 241 for one lighting panel 124 of track-and-rotation system 120, according to some embodiments of the present invention.

FIG. 3B is close-up perspective-view diagram of a bottom portion of panel pinion-gear key structure 312 of a panel pinion gear assembly 241 for one lighting panel 124 of panel-support-and-rotation system 120, according to some embodiments of the present invention. The various reference numbers are described in the description for FIG. 3A, above.

Figure 4:
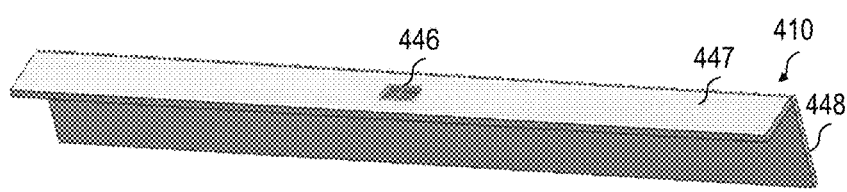
FIG. 4 is a perspective-view diagram of a panel-suspension bracket 410 for one lighting panel 124 of panel-support-and-rotation system 120, according to some embodiments of the present invention.

FIG. 4 is a perspective-view diagram of a panel-suspension bracket 410 for one lighting panel 124 of panel-support-and-rotation system 120, according to some embodiments of the present invention. In some embodiments, panel-suspension bracket 410 includes a vertical wall 448 that is affixed (using threaded fasteners, adhesive and/or other suitable affixing means) to light panel 124, and a horizontal top section 447 with a keyed hole 446 that corresponds to keyed feature 346 of panel pinion gear assembly 241. In some embodiments, cap screw 345 and a suitable washer are used to affix panel-suspension bracket 410 to its respective panel pinion gear assembly 241.

Figure 5:
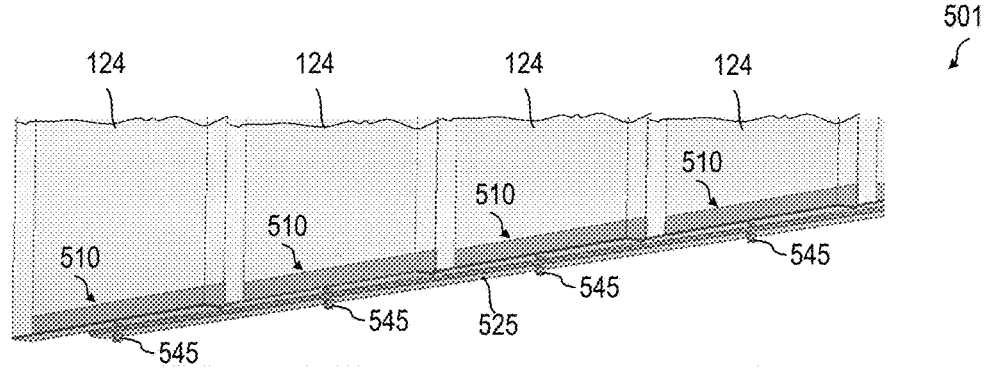
FIG. 5 is a close-up perspective-view diagram of a panel bottom-spacing structure 501 for a plurality of lighting panels 124 of panel-support-and-rotation system 120, according to some embodiments of the present invention.

FIG. 5 is a close-up perspective-view diagram of a panel bottom-spacing structure 501 for a plurality of lighting panels 124 of panel-support-and-rotation system 120, according to some embodiments of the present invention. In some embodiments, panel bottom-spacing structure 501 includes a bottom bar 525 to which each of the lighting panels 124 is rotatably attached, at its bottom. In some embodiments, each lighting panel 124 is attached to a bottom bracket 510 (e.g., in some embodiments, similar to top bracket 410 described above, but with a round hole rather than a keyed hole). In some embodiments, threaded fasteners 545 pass through bottom bar 525 and attach to bottom brackets 510, and rotate freely relative to bottom bar 510 while maintaining the fixed distance between adjacent lighting panels 124 as the panels rotate from facing one side of the aisle to the opposite side of the aisle.

Figure 6A:
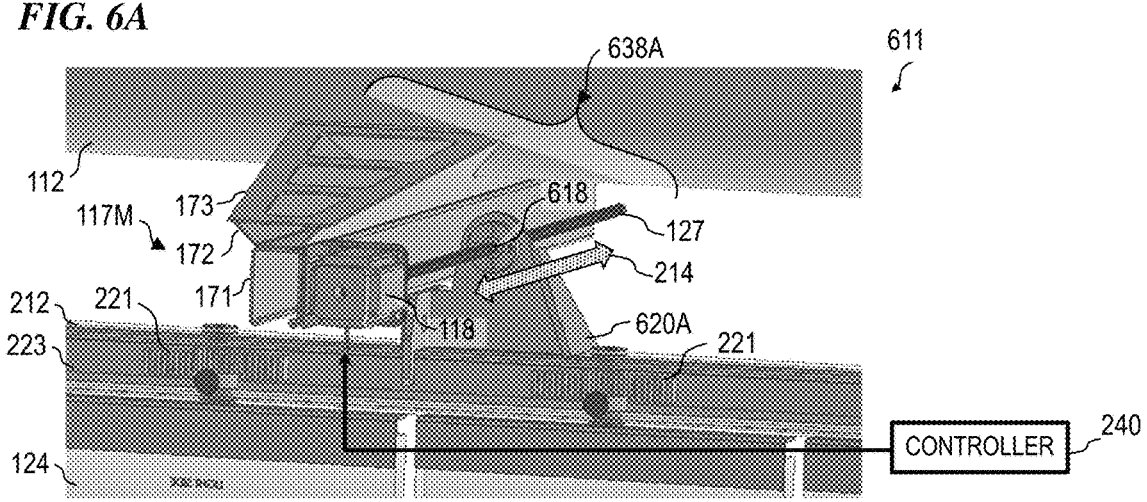
FIG. 6A is close-up perspective-view diagram 611 of a portion of a track-motion mechanism 638 for laterally moving panel-support-and-rotation system 120 to different locations across an aisle, according to some embodiments of the present invention.

FIG. 6A is close-up perspective-view diagram 611 of a portion of a track-motion mechanism 638A (e.g., mechanism 638A may be near the left-hand end of tube 112 in FIG. 1A) for laterally moving panel-support-and-rotation system 120 to different lateral locations across an aisle in order for lighting panels 124 to be closer to or further from the plants being illuminated and/or to move the lighting panels out of the way to allow harvesting or plant inspection, care and treatment, according to some embodiments of the present invention. In some embodiments, track-motion mechanism 638A includes a rotary motor 118 (powered and controlled by power supply and controller 240) that rotates threaded rod 127, and nut 618 (such as an acme-threaded lead screw and nut; also known as single-start and self-locking lead screws and nuts, these screws have a single thread that runs the length of the screw, wherein—since the nut travels laterally only when the screw turns—the system will not unexpectedly move when the lead screw is at rest), wherein threaded nut 618 is fixed to bracket 620A, and wherein bracket 620A is affixed (e.g., in some embodiments, by welding) to top rectangular tube 212. Thus, when motor 118 turns threaded rod 127, rod 127 causes nut 618 to move along the length of threaded rod 127, pushing or pulling lighting panels 124 to be closer to or further from the plants being illuminated and/or to move the lighting panels out of the way to allow harvesting and the like.

Figure 6B:
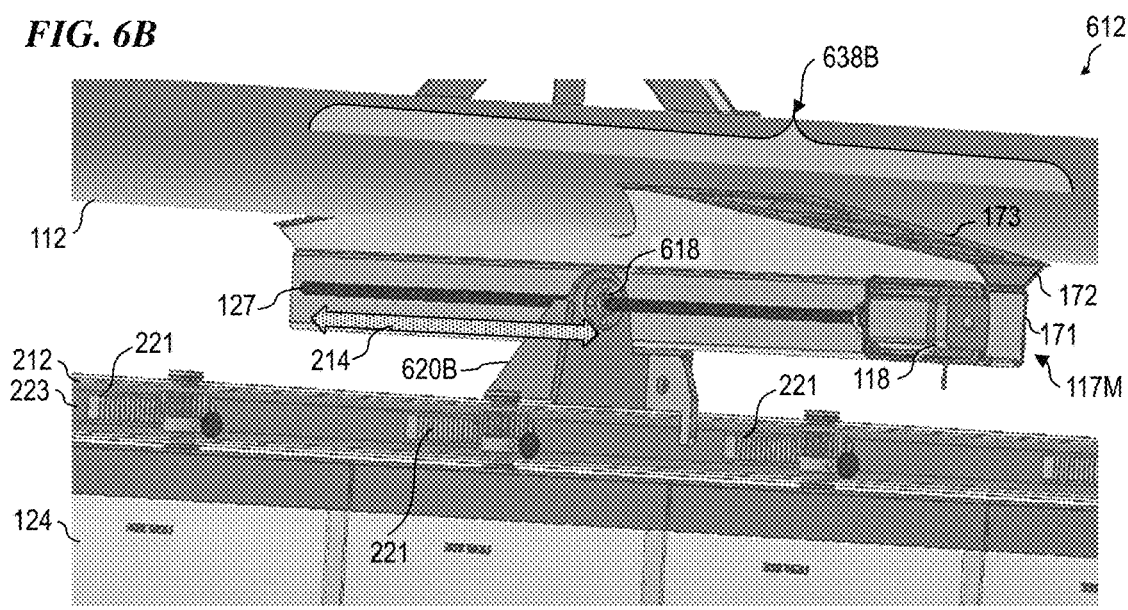
FIG. 6B is another close-up perspective view diagram 612 of a portion of a track-motion mechanism 638 for laterally moving panel-support-and-rotation system 120 to different locations across an aisle, according to some embodiments of the present invention.

FIG. 6B is another close-up perspective-view diagram 612 of a portion of a track-motion mechanism 638B (e.g., mechanism 638B may be near the right-hand end of tube 112 in FIG. 1A) for laterally moving panel-support-and-rotation system 120 to different locations across an aisle, according to some embodiments of the present invention. In some embodiments, track-motion mechanism 638B is a mirror-image version of track-motion mechanism 638A.

Figure 6C:
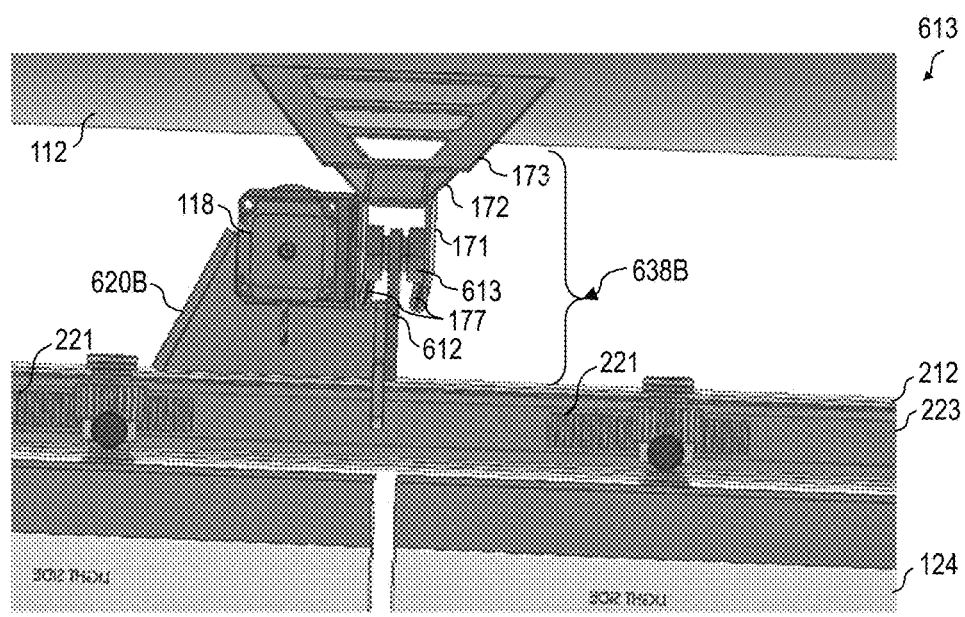
FIG. 6C is yet another close-up perspective-view diagram 613 of a portion of a track-motion mechanism 638 for laterally moving track-and-rotation system 120 to different locations across an aisle, according to some embodiments of the present invention.

FIG. 6C is yet another close-up perspective view diagram 613 of a portion of a track-motion mechanism 638B for laterally moving panel-support-and-rotation system 120 to different locations across an aisle, according to some embodiments of the present invention. Shown in FIG. 6C is wheeled trolley 612 with wheels 613 that ride on the inner rims of strut 171. In some embodiments, wheeled trolley 612 includes four ball-bearing wheels 613 for balance and long life. In some embodiments, the base of wheeled trolley 612 is welded to bracket 620B.

Figure 7A:
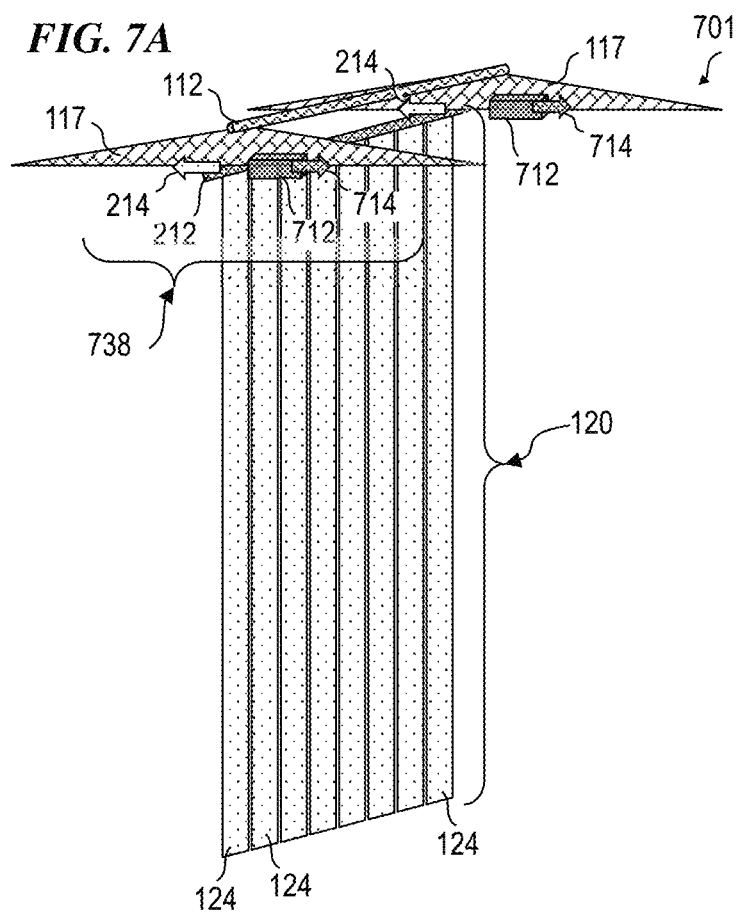
FIG. 7A is an end-view diagram of a system 701 that adds to system 101 a counterbalanced track-motion mechanism 738 for laterally moving both a counterweight 712 in one direction 714 and panel-support-and-rotation system 120 in opposite direction 214 to different lateral locations across an aisle while maintaining a center-of-balance of the mass suspended from an elongated top support 112, according to some embodiments of the present invention.

FIG. 7A is an end-view diagram of a system 701 that adds to system 101 a counterbalanced track-motion mechanism 738 for laterally moving both a counterweight 712 in one direction 714 and panel-support-and-rotation system 120 in opposite direction 214 to different lateral locations across an aisle, while maintaining a center-of-balance of the mass suspended from overhead pipe 112, according to some embodiments of the present invention. In some embodiments, system 701 has one or more weight-motion mechanism(s) 738 that move a counterweight mass 712 in a corresponding but opposite direction as track-motion mechanism 638 moves lighting sheet system 120.

Figure 7B:
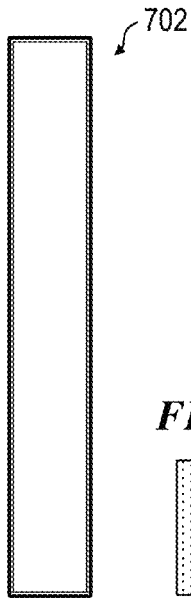
FIG. 7B is an elevation-view diagram of a metal frame 702 usable to hold a plurality of LED circuits end-to-end to form a lighting panel 704 that can be used for lighting panel 124, according to some embodiments of the present invention.

FIG. 7B is an elevation-view diagram of a metal frame 702 usable to hold a plurality of LED circuits end-to-end to form a lighting panel 704 that can be used for lighting panel 124, according to some embodiments of the present invention. In some embodiments, frame 702 is made from aluminum or an aluminum alloy, and is approximately or exactly one foot wide and eight feet high and configured to hold four LED circuits 703 connected to one another electrically and held end-to end in frame 702.

Figure 7C:
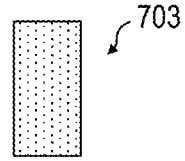
FIG. 7C is an elevation-view diagram of a LED circuit 703 usable to be held in a frame 702 to form a lighting panel 704 that can be used for lighting panel 124, according to some embodiments of the present invention.

FIG. 7C is an elevation-view diagram of a LED circuit 703 usable to be held in a frame 702 to form a lighting panel 704 that can be used for lighting panel 124, according to some embodiments of the present invention. In some embodiments, each LED circuit 703 is approximately or exactly one foot wide and two feet high.

Figure 7D:
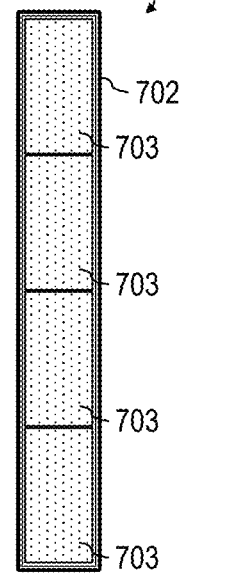
FIG. 7D is an elevation-view diagram of a lighting panel 704 that can be used for lighting panel 124, according to some embodiments of the present invention.

FIG. 7D is an elevation-view diagram of a lighting panel 704 that can be used for lighting panel 124, according to some embodiments of the present invention.

Figure 7E:
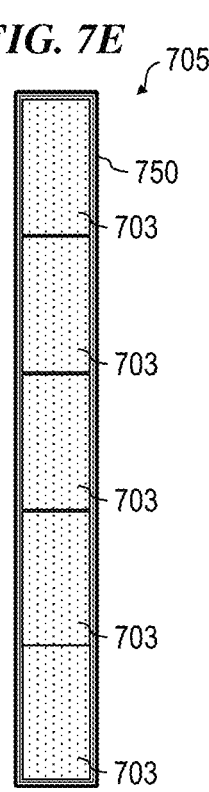
FIG. 7E is an elevation-view diagram of a lighting panel 705 that can be used for lighting panel 124, according to some embodiments of the present invention.

FIG. 7E is an elevation-view diagram of a lighting panel 705 that can be used for lighting panel 124, according to some embodiments of the present invention. In some embodiments, frame 750 is made from aluminum or an aluminum alloy, and is approximately or exactly one foot wide and ten feet high and configured to hold five LED circuits 703 connected to one another electrically and held end-to end in frame 750.

Figure 7F:
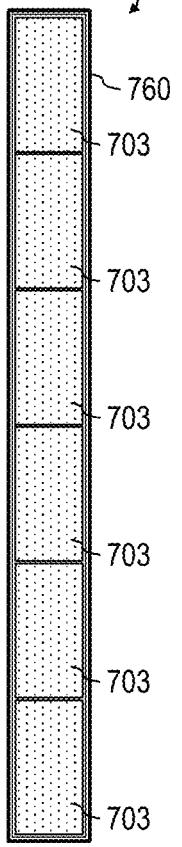
FIG. 7F is an elevation-view diagram of a lighting panel 706 that can be used for lighting panel 124, according to some embodiments of the present invention.

FIG. 7F is an elevation-view diagram of a lighting panel 706 that can be used for lighting panel 124, according to some embodiments of the present invention. In some embodiments, frame 750 is made from aluminum or an aluminum alloy, and is approximately or exactly one foot wide and twelve feet high and configured to hold six LED circuits connected to one another electrically and held end-to end in frame 760.

FIG. 8A is perspective-view diagram of a portion of an indoor grow-space warehouse 801 in a first configuration that includes one or more systems 101 for laterally moving panel-support-and-rotation system 120 to different locations across the width of an aisle 99, with the light-emitting face of panels 124 facing the left side of aisle 99, according to some embodiments of the present invention. In some embodiments, indoor grow-space warehouse 801 includes a plurality of hydroponic grow towers 820 (see, e.g., U.S. patent application Ser. No. 17/686,185 titled "PLANT-GROWING APPARATUS AND METHOD," U.S. Design patent application Ser. No. 29/839,675 titled "VERTICAL PLANT-GROWING TOWER," and U.S. Pat. No. 9,491,915 titled "Vertical hydroponic plant production apparatus," each of which is incorporated herein by reference), each holding a plurality of botanical plants growing out the side(s) of each tower 820. In some embodiments, the plurality of botanical plants along an aisle 99 are at a plurality of different stages of their growth, on the two sides of the aisle. In the embodiment shown, plants 821B on the left-hand side of aisle 99 are older, larger and more mature than the seedlings 821A on the right-hand side of aisle 99, and therefore will benefit from different lighting schedules and durations, distances to lighting panels 124, spectra during different times of the daily (or other time period) light-and-dark schedules, and possibly other parameters. In some embodiments, when large plants are growing along the left-hand side of aisle 99, it is efficient to turn on all or most of those lighting panels directly facing the towers holding the large plants and to have the illuminated light panels located at a distance from the plants so as not to touch the plants (due to the adverse effects of heat from the LED lighting panels), while illuminating the top, sides and bottoms of the large plants.

FIG. 8B is another perspective-view diagram of a portion of indoor grow-space warehouse in a second configuration 802 with the light-emitting face of panels 124 facing the right side of aisle 99 and panel-support-and-rotation system 120 moved closer to the seedlings on the right side of the aisle and with some of the lighting panels 124 turned off. In some embodiments, when seedlings and small plants are growing along the right-hand side of aisle 99, it is energy efficient to turn on only those lighting panels directly facing the towers holding seedlings and to have the illuminated light panels located close to the seedlings (but not touching due to the adverse effects of heat from the LED lighting panels), while turning off others of the lighting panels that are adjacent unpopulated spaces between those towers 820 that hold seedlings. Also, by moving panel-support-and-rotation system 120 to the right side of aisle 99, two of the four towers 820 shown on the left side of aisle 99 in FIG. 8A have been removed for harvesting in the configuration 802 of FIG. 8B.

Figure 8C:
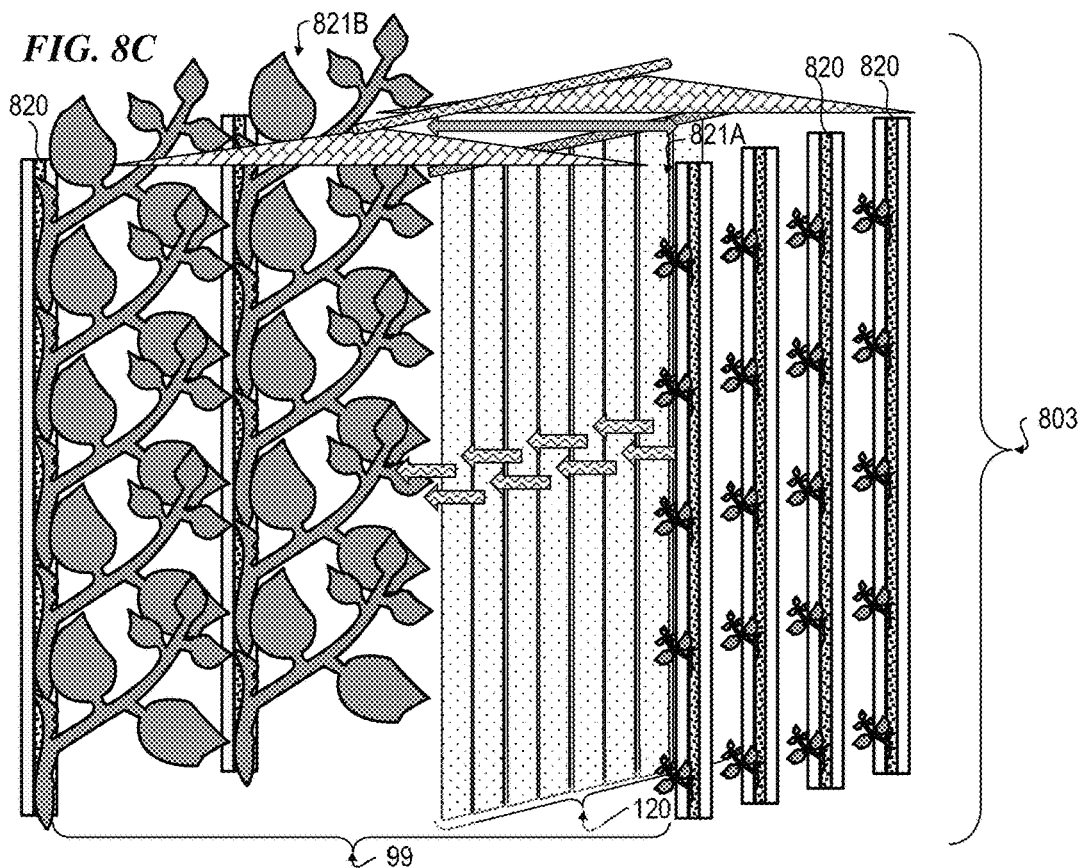
FIG. 8C is another perspective-view diagram of a portion of indoor grow-space warehouse 803 in a configuration with the light-emitting face of panels 124 facing the left side of aisle 99 and track-and-rotation system 120 moved further from the large growing plants on the left side of the aisle to avoid touching and/or overheating the left-hand-side plants.

FIG. 8C is another perspective view diagram of a portion of indoor grow-space warehouse in a third configuration 803 with the light-emitting face of panels 124 facing the left side of aisle 99 and panel-support-and-rotation system 120 moved further from the large growing plants on the left side of the aisle to avoid touching and/or overheating the left-hand-side plants.

Figure 9:
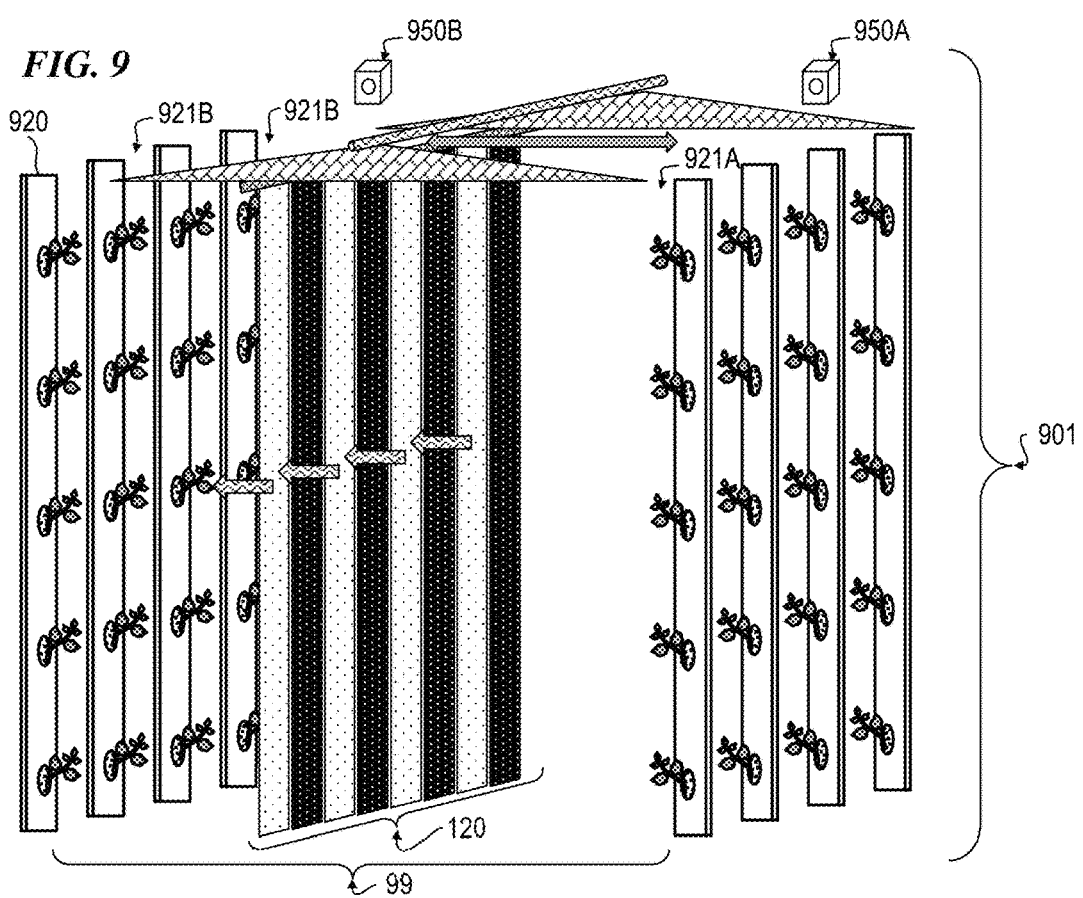
FIG. 9 is perspective-view diagram of a portion of indoor grow-space warehouse 901 in a configuration that uses grow towers 920, with the light-emitting face of panels 124 facing the left side of aisle 99 and panel-support-and-rotation system 120 moved closer to the seedlings on the left side of the aisle and with some of the lighting panels 124 turned off.

FIG. 9 is perspective view diagram of a portion of indoor grow-space warehouse 901 in a configuration that uses grow towers 920, with the light-emitting face of panels 124 facing the left side of aisle 99 and panel-support-and-rotation system 120 moved closer to the seedlings 921B on the left side of the aisle than to the seedlings 921A on the right side of the aisle, and with some of the lighting panels 124 turned off. In some embodiments, each one of vertical hydroponic grow towers 920 include two vertical enclosure pieces including a back wall having three perpendicular faces—a back face and two parallel side faces—and a front wall having a plurality of vertically spaced-apart openings through which the plant roots are inserted into the enclosed fibrous root medium, such as shown and described in U.S. Design patent application Ser. No. 29/839,675 filed May 23, 2022 by Golle et al. with the title "VERTICAL PLANT-GROWING TOWER," which is incorporated herein by reference. Some embodiments further include one or more cameras with image-analysis software, or other light sensors 950A and/or 950B that are used for (a) obtaining and analyzing an image to determine how close the light panel system 120 is to the plants 921A and 921B in order to avoid touching the plants (to avoid overheating) and/or (b) for obtaining and analyzing an image to sense the color spectrum of the plants 921A and 921B in order to sense readiness for harvest or other characteristics of the plants 921A and 921B, such as described in U.S. patent application Ser. No. 17/686,185, which was filed Mar. 3, 2022 by Golle et al. with the title "PLANT-GROWING APPARATUS AND METHOD," and which is incorporated herein by reference.

Referring to the figures and the description above, in some embodiments, the present invention provides an apparatus for mass production of plants, such as in an indoor growing facility arranged in a warehouse. This apparatus includes a first plant-light system (e.g., 101 or 701) having an elongated top support 112 arranged along a length of an aisle 99; a first plurality of tracks 117 that are affixed to the elongated top support 112 and oriented at a non-parallel angle (e.g., in some embodiments, perpendicular) to the length of aisle 99; a light panel system 120 that includes: a laterally moveable elongated panel-support structure 212 suspended from the first plurality of tracks 117, wherein the panel-support structure 212 has a length, a first plurality of plant-lighting panels 124 each suspended from the elongated panel-support structure 212, wherein each panel 124 of the first plurality of plant-lighting panels 124 is rotatable around a vertical axis of the panel 124, and wherein the lighting panels 124 of the first plurality of lighting panels 124 are arranged along the length of the panel-support structure 212; a plant-sheet rotation system 218 configured to rotate the first plurality of the plant-lighting panels 124 between a first orientation facing a first side of the aisle 88 and a second orientation facing a second (opposite) side of the aisle 99, wherein the first plurality of the plant-lighting panels 124 is substantially parallel relative to the length of the aisle 99 when in the first orientation and when in the second orientation; a controller 130 or 240; and a panel-system lateral-motion system operably coupled to the controller 130 or 240 and configured to move the laterally moveable elongated panel-support structure, under control of the controller 130 or 240, to a plurality of lateral positions within the aisle.

Some embodiments further include at least one respective rotary encoder 219 operatively coupled to sense a rotational angle of a respective one of the plant-lighting panels 124, and operatively coupled to the controller to control rotation of the first plurality of the plant-lighting panels 124.

Some embodiments further include a plurality of trolleys 612 affixed to the elongated panel-support structure, wherein each trolley 612 of the plurality of trolleys 612 includes a plurality of wheels 613, wherein each track 117 of the first plurality of tracks 117 includes a pi-shaped strut 171 having two interior support surfaces 177, and wherein the plurality of wheels 613 of each trolley 612 ride on the two interior support surfaces 177 of a corresponding one of the first plurality of tracks 171; and wherein the panel-system lateral-motion system includes at least one linear actuator.

Some embodiments further include a plurality of trolleys 612 affixed to the elongated panel-support structure, wherein each trolley 612 of the plurality of trolleys 612 includes a plurality of wheels 613, wherein each track 117 of the first plurality of tracks 117 includes a portion made from pi-shaped strut 171 having two interior support surfaces 177, and wherein the plurality of wheels 613 of each trolley 612 ride on the two interior support surfaces 177 of a corresponding one of the first plurality of tracks 117; and wherein the panel-system lateral-motion system includes one or more linear actuators that each includes a rotary motor 118 attached to one of the plurality of tracks, a threaded nut 618 held in a bracket 620 affixed to the elongated panel-support structure, a threaded rod 127 that passes through the threaded nut 618 and that is rotatable by the rotary motor 118.

In some embodiments of the apparatus, the plant-sheet rotation system is configured to simultaneously rotate all of the first plurality of the plant-lighting panels 124 between the first orientation facing the first side of the aisle and the second orientation facing the second side of the aisle. In other embodiments (not shown), each panel of the first plurality of the plant-lighting panels 124 is rotated by its own respective rotary motor (optionally including a gear-reduction mechanism), and thus can be rotated at various different times or can all be rotated simultaneously.

In some embodiments of the apparatus, the plant-sheet rotation system is configured to simultaneously rotate all of the first plurality of the plant-lighting panels between the first orientation facing the first side of the aisle and the second orientation facing the second side of the aisle, wherein the plant-sheet rotation system includes a plurality of pinion gears including a pinion gear attached to each one of the first plurality of plant-lighting panels, and a linearly movable elongated bar having a rack-gear structure adjacent each of the plurality of pinion gears such that when the elongated bar is moved each one of the plurality of pinion gears rotates across an equivalent angle and the first plurality of the plant-lighting panels is thus moved from the first orientation to the second orientation.

Some embodiments further include a bar-motion linear actuator configured to linearly move the elongated bar, wherein the bar-motion linear actuator includes a rotary motor and gear-reduction mechanism attached to elongated panel-support structure, the gear-reduction mechanism having an output shaft, an output pinion gear affixed to the output shaft, and a rack gear that is affixed to the elongated bar and that interfaces to the output pinion gear such that rotary motion of the output pinion gear causes linear motion of the elongated bar.

In some embodiments of the apparatus, the plant-sheet rotation system includes a rotary motor attached to each one of the first plurality of the plant-lighting panels and configured to rotates its corresponding lighting panel between the first orientation facing the first side of the aisle and the second orientation facing the second side of the aisle.

In some embodiments of the apparatus, each panel of the first plurality of plant-lighting panels includes one or more circuit substrates, each circuit substrate including a plurality of light emitters arranged across a surface of each circuit substrate.

In some embodiments of the apparatus, each panel of the first plurality of plant-lighting panels includes one or more circuit substrates, each circuit substrate including a plurality of light-emitting diodes arranged in a grid across a surface of each circuit substrate.

Some embodiments of the apparatus further include a plurality of plant-holding systems arranged along the length of the aisle facing the plurality of plant lighting panels on both sides of the aisle, wherein the controller is configured to control a lighting schedule, a lighting spectrum, and a lighting intensity of each of the first plurality of plant-lighting panels.

Some embodiments of the apparatus further include a plurality of vertical grow towers arranged along the length of the aisle facing the plurality of plant lighting panels on both sides of the aisle.

Some embodiments of the apparatus further include a plurality of shelves arranged along the length of the aisle facing the plurality of plant lighting panels on both sides of the aisle (such as shown in U.S. Pat. No. 10,595,469 titled "LIGHTING FIXTURE AND METHOD FOR MAKING AND USING," which is incorporated herein by reference).

In some embodiments of the apparatus, each lighting panel 124 (e.g., as implemented by panels 704, 705 or 706) of the first plurality of plant-lighting panels 124 includes a plurality of LEDs. In some embodiments, each lighting panel 124 (e.g., as implemented by panels 704, 705 or 706) of the first plurality of plant-lighting panels 124 includes a plurality of LED circuit sheets each including a plurality of LEDs.

In some embodiments of the apparatus, the plurality of LEDs includes one or more LEDs emitting light that appears red, one or more LEDs emitting light that appears blue and one or more LEDs emitting light that appears white. In some embodiments, the red and blue LEDs are substantially or completely turned off, and the white LEDs are activated to output white light for harvesting plants.

In some embodiments of the apparatus, each panel of the first plurality of plant-lighting panels has a length and a width, wherein the length of each plant lighting sheet is at least five times the width. In some embodiments, the length of each plant lighting sheet is at least four times the width. In some embodiments, the length of each plant lighting sheet is at least six times the width. In some embodiments, the length of each plant lighting sheet is at least eight times the width. In some embodiments, the length of each plant lighting sheet is at least ten times the width. In some embodiments, the length of each plant lighting sheet is at least fourteen times the width. In some embodiments, the length of each plant lighting sheet is at least sixteen times the width. In some embodiments, the length of each plant lighting sheet is at least twenty times the width.

Referring again to the figures and the description above, in some embodiments, the present invention provides a method for illuminating plants arranged along each of two sides of an aisle, the method including providing a panel system that includes: an elongated panel-support structure suspended in the aisle, wherein the panel-support structure has a length; a first plurality of plant-lighting panels, each panel of which is suspended from the elongated panel-support structure, wherein each panel of the first plurality of plant-lighting panels is rotatable around a vertical axis of the panel, and wherein the lighting panels of the first plurality of lighting panels are arranged along the length of the panel-support structure; rotating (for example, in some embodiments, on a daily basis such as twelve hours) the first plurality of the plant-lighting panels between a first orientation facing a first side of the aisle and a second orientation facing a second side of the aisle, wherein the first plurality of the plant-lighting panels is substantially parallel relative to the length of the aisle when in the first orientation and when in the second orientation (for example, in some embodiments, on a daily basis such as twelve hours in the first orientation and twelve hours in the second orientation); and laterally moving the elongated panel-support structure to a plurality of lateral positions within the aisle.

In some embodiments of the method, the rotating of the first plurality of the plant-lighting panels is done using a rack-and-pinion gear system.

In some embodiments of the method, the laterally moving of the elongated panel-support structure is done using a rotary motor, a threaded rod and a threaded nut.

Some embodiments of the method further include obtaining an image of growing plants and the panel system, determining a distance between the panel system and one or more of the plants, and adjusting a lateral position based on the determined distance.

Some embodiments of the method further include obtaining an image of growing plants, determining a color spectrum of light reflected from one or more of the plants, and adjusting a color spectrum, illumination timing, and/or intensity of light from the light-panel system.

In some embodiments of the method, the rotating of all the first plurality of the plant-lighting panels is done simultaneously.

In some embodiments of the method, the rotating of at least one of the first plurality of the plant-lighting panels is done independently of others of the first plurality of the plant-lighting panels.

In some embodiments of the method, the rotating of each respective one of the first plurality of the plant-lighting panels is done by a corresponding respective one of a plurality of motors.

Referring further to the figures and the description above, in some embodiments, the present invention provides an apparatus for illuminating plants arranged along each of two sides of an aisle, the apparatus including: a panel system having an elongated panel-support structure suspended in the aisle, wherein the panel-support structure has a length; a first plurality of plant-lighting panels, each panel of which is suspended from the elongated panel-support structure, wherein each panel of the first plurality of plant-lighting panels is rotatable around a vertical axis of the panel, and wherein the lighting panels of the first plurality of lighting panels are arranged along the length of the panel-support structure; means for rotating the first plurality of the plant-lighting panels between a first orientation facing a first side of the aisle and a second orientation facing a second side of the aisle, wherein the first plurality of the plant-lighting panels is substantially parallel relative to the length of the aisle when in the first orientation and when in the second orientation; and means for laterally moving the elongated panel-support structure to a plurality of lateral positions within the aisle. In some embodiments, the apparatus further includes means for sensing a distance between the plants and the first plurality of plant-lighting panels and for controlling the means for laterally moving based on the sensed distance.

Some embodiments of the apparatus further include means for obtaining an image of growing plants and the panel system, means for determining a distance between the panel system and one or more of the plants, and means for adjusting a lateral position based on the determined distance.

Some embodiments of the method further include means for obtaining an image of growing plants, means for determining a color spectrum of light reflected from one or more of the plants, and means for adjusting a color spectrum, illumination timing, and/or intensity of light from the light-panel system.

In some embodiments of the method, the means for rotating rotates the first plurality of the plant-lighting panels simultaneously.

In some embodiments of the method, the means for rotating rotates at least one of the first plurality of the plant-lighting panels independently of rotating others of the first plurality of the plant-lighting panels.

In some embodiments of the method, the means for rotating rotates each respective one of the first plurality of the plant-lighting panels by a corresponding respective one of a plurality of motors.

Referring yet further to the figures and the description above, in some embodiments, the present invention provides an apparatus having an elongated bracket having a first end and a second end, the bracket being selectively movable to a plurality of distances from plants growing on vertical plant holders; a plurality of light-emitting LED sheets hung from and spaced along the bracket, each one of the plurality of light-emitting LED sheets being rotatable about a vertical axis; and a control unit configured to adjust the distance of the bracket and the plurality of light-emitting LED sheets from the plants and to control the rotation of the plurality of light-emitting LED sheets. In some embodiments of this apparatus, the vertical plant holders are arranged in a plane. Some embodiments of this apparatus further include an overhead unit supporting the bracket. Some embodiments of this apparatus further include a power source configured to supply electricity to the LED sheets and the control unit. Some embodiments of this apparatus further include a sensor configured to detect locations of the plants and adjusting the distance of the bracket accordingly. In some embodiments, the LED sheet includes a plurality of LED modules arranged in a predetermined pattern. Some embodiments of this apparatus further include a plurality of diffusers configured to spread light emitted by the LED modules.

Referring again to the figures and the description above, in some embodiments, the present invention provides a method for illuminating plants including: providing an elongated bracket having a first end and a second end, the bracket being selectively movable to a plurality of distances from plants growing on vertical plant holders; a plurality of light-emitting LED sheets hung from and spaced along the bracket, each one of the plurality of light-emitting LED sheets being rotatable about a vertical axis; adjusting the distance of the first end of the bracket from the plants using the control unit; rotating each respective one of the plurality of LED sheets about its respective vertical axis; and selectively supplying electricity to the plurality of light-emitting LED sheets such that the plurality of light-emitting LED sheets emit light onto the plants.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus for mass production of plants, the apparatus comprising:
    a first plant-light system that includes:
        an elongated top support arranged along a length of an aisle;
        a first plurality of tracks that are affixed to the elongated top support and oriented at a non-parallel angle to the length of the aisle;
        a controller;
        a panel system that includes:
            a laterally moveable elongated panel-support structure suspended from the first plurality of tracks, wherein the panel-support structure has a length, and
            a first plurality of plant-lighting panels, each panel of which is suspended from the elongated panel-support structure, wherein each panel of the first plurality of plant-lighting panels is rotatable around a vertical axis of the panel, and wherein the plant-lighting panels of the first plurality of plant-lighting panels are arranged along the length of the panel-support structure; and
        a plant-lighting-panel rotation system operably coupled to the controller and configured to rotate all of the first plurality of the plant-lighting panels, under control of the controller, between a first orientation relative to the length of the aisle and a second orientation relative to the length of the aisle, and wherein the controller is configured to control lighting from the plurality of plant-lighting panels according to a plurality of lighting schedules, wherein each one of the plurality of lighting schedules specifies one of a plurality of different lighting spectra for each of a plurality of daily time periods.

2. The apparatus of claim 1, further comprising:
a plant-lighting-panel lateral-motion system operably coupled to the controller and configured to move the laterally moveable elongated panel-support structure, under control of the controller, to a plurality of lateral positions within the aisle.

3. The apparatus of claim 2, further comprising:
a plurality of trolleys affixed to the elongated panel-support structure, wherein each trolley of the plurality of trolleys includes a plurality of wheels, wherein each track of the first plurality of tracks is made from pi-shaped strut having two interior support surfaces, and wherein the plurality of wheels of each trolley ride on the two interior support surfaces of a corresponding one of the first plurality of tracks; and
wherein the plant-lighting-panel lateral-motion system includes at least one linear actuator.

4. The apparatus of claim 2, further comprising:
a plurality of trolleys affixed to the elongated panel-support structure, wherein each trolley of the plurality of trolleys includes a plurality of wheels, wherein each track of the first plurality of tracks is made from pi-shaped strut having two interior support surfaces, and wherein the plurality of wheels of each trolley ride on the two interior support surfaces of a corresponding one of the first plurality of tracks; and
wherein the plant-lighting-panel lateral-motion system includes one or more linear actuators that each includes a rotary motor attached to one of the plurality of tracks, a threaded nut held in a bracket affixed to the elongated panel-support structure, a threaded rod that passes through the threaded nut and that is rotatable by the rotary motor.

5. The apparatus of claim 1, wherein the plant-sheet rotation system is configured to simultaneously rotate all of the first plurality of the plant-lighting panels between the first orientation facing a first side of the aisle and the second orientation facing a second side of the aisle, wherein the plant-sheet rotation system includes a plurality of pinion gears including a pinion gear attached to each one of the first plurality of plant-lighting panels, and a linearly movable elongated bar having a rack-gear structure adjacent each of the plurality of pinion gears such that when the elongated bar is moved each one of the plurality of pinion gears rotates across an equivalent angle and the first plurality of the plant-lighting panels is thus moved from the first orientation to the second orientation.

6. The apparatus of claim 5, further comprising a bar-motion linear actuator configured to linearly move the elongated bar, wherein the bar-motion linear actuator includes a rotary motor and gear-reduction mechanism attached to elongated panel-support structure, the gear-reduction mechanism having an output shaft, an output pinion gear affixed to the output shaft, and a rack gear that is affixed to the elongated bar and that interfaces to the output pinion gear such that rotary motion of the output pinion gear causes linear motion of the elongated bar.

7. The apparatus of claim 1, wherein the plant-sheet rotation system includes a rotary motor attached to each one of the first plurality of the plant-lighting panels and configured to rotates its corresponding lighting panel between the first orientation facing the first side of the aisle and the second orientation facing the second side of the aisle.

8. The apparatus of claim 1, wherein each of the first plurality of plant-lighting panels includes one or more circuit substrates, each circuit substrate including a plurality of light emitters arranged across a surface of each circuit substrate.

9. The apparatus of claim 1, wherein each of the first plurality of plant-lighting panels includes one or more circuit substrates, each circuit substrate including a plurality of light-emitting diodes arranged in a grid across a surface of each circuit substrate.

10. The apparatus of claim 1, further comprising:
a plurality of plant-holding systems arranged along the length of the aisle facing the plurality of plant-lighting panels on both sides of the aisle.

11. The apparatus of claim 1, further comprising:
a plurality of vertical grow towers arranged along the length of the aisle facing the plurality of plant-lighting panels on both sides of the aisle.

12. The apparatus of claim 1, further comprising:
a plurality of shelves arranged along the length of the aisle facing the plurality of plant-lighting panels on both sides of the aisle.

13. The apparatus of claim 1, wherein each panel of the first plurality of plant-lighting panels includes a plurality of LEDs.

14. The apparatus of claim 13, wherein the plurality of LEDs includes one or more LEDs emitting light that appears red, one or more LEDs emitting light that appears blue and one or more LEDs emitting light that appears white.

15. The apparatus of claim 1, wherein each panel of the first plurality of plant-lighting panels has a length and a width, wherein the length of each plant lighting sheet is at least five times the width.

16. A method for illuminating plants arranged along each of two sides of an aisle, the method comprising:
providing a panel system that includes:
an elongated panel-support structure suspended in the aisle, wherein the panel-support structure has a length;
a first plurality of plant-lighting panels, each panel of which is suspended from the elongated panel-support structure, wherein each panel of the first plurality of plant-lighting panels is rotatable around a vertical axis of the panel, and wherein the plant-lighting panels of the first plurality of plant-lighting panels are arranged along the length of the panel-support structure;
rotating the first plurality of the plant-lighting panels between a first orientation relative to the length of the aisle and a second orientation relative to the length of the aisle; and
controlling lighting from the plurality of plant-lighting panels according to a plurality of lighting schedules, wherein each one of the plurality of lighting schedules specifies one of a plurality of different lighting spectra for each of a plurality of daily time periods.

17. The method of claim 16, wherein the rotating of the first plurality of the plant-lighting panels is done using a rack-and-pinion gear system.

18. The method of claim 16, further comprising:
laterally moving the elongated panel-support structure to a plurality of lateral positions within the aisle, wherein the laterally moving of the elongated panel-support structure is done using a rotary motor, a threaded rod and a threaded nut.

19. An apparatus for illuminating plants arranged along each of two sides of an aisle, the apparatus comprising:

a panel system that includes:
- an elongated panel-support structure suspended in the aisle, wherein the panel-support structure has a length; and
- a first plurality of plant-lighting panels, each panel of which is suspended from the elongated panel-support structure, wherein each panel of the first plurality of plant-lighting panels is rotatable around a vertical axis of the panel, and wherein the lighting panels of the first plurality of plant-lighting panels are arranged along the length of the panel-support structure;

means for rotating the first plurality of the plant-lighting panels between a first orientation facing a first side of the aisle and a second orientation facing a second side of the aisle, wherein the first plurality of the plant-lighting panels is substantially parallel relative to the length of the aisle when in the first orientation and when in the second orientation; and means for controlling lighting from the plurality of plant-lighting panels according to a plurality of lighting schedules, wherein each one of the plurality of lighting schedules specifies one of a plurality of different lighting spectra for each of a plurality of daily time periods.

20. The apparatus of claim 19, further comprising:

means for laterally moving the elongated panel-support structure to a plurality of lateral positions within the aisle; and means for sensing a distance between the plants and the first plurality of plant-lighting panels and for controlling the means for laterally moving based on the sensed distance.

\* \* \* \* \*